Aug. 16, 1966 R. F. PALUMBI 3,266,175
FORCE MEASURING EDUCATIONAL KIT
Filed Feb. 14, 1964 2 Sheets-Sheet 1

INVENTOR
Robert F. Palumbi
BY Walter G. Finch
ATTORNEY

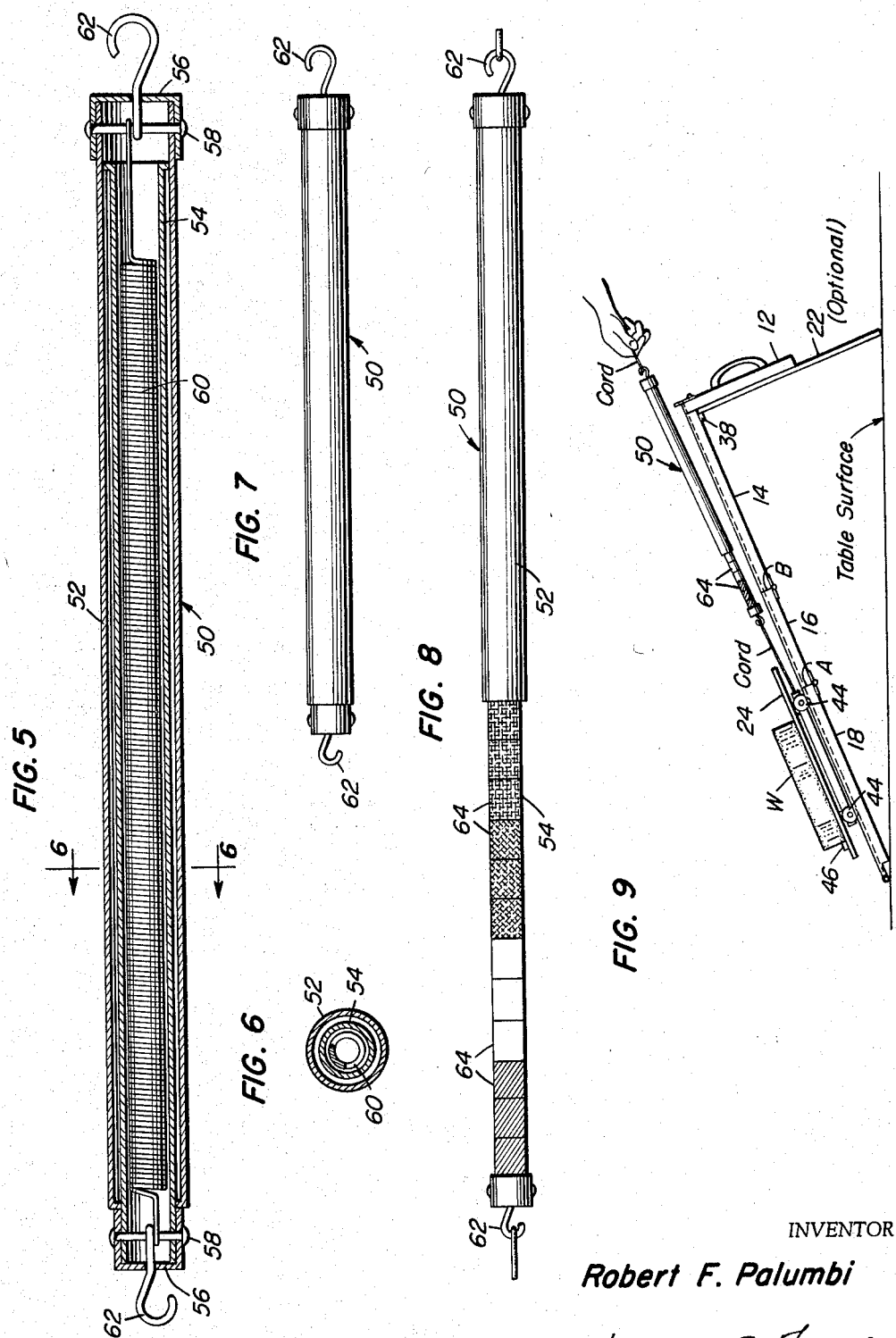

United States Patent Office 3,266,175
Patented August 16, 1966

3,266,175
FORCE MEASURING EDUCATIONAL KIT
Robert F. Palumbi, Baltimore, Md., assignor of twenty-five percent to Walter G. Finch and twenty-five percent to H. Kemp MacDaniel, both of Baltimore, Md.
Filed Feb. 14, 1964, Ser. No. 344,918
9 Claims. (Cl. 35—19)

This invention relates generally to educational devices, and more particularly it pertains to a mechanics demonstration kit or a force measuring educational kit.

In expounding the principles of machines before large classes, the teacher has heretofore been limited to the use of small size apparatus which is clearly visible only to a few of the class. The provision of larger apparatus using color as an additional visual aid is much to be desired.

It is an object of this invention, therefore, to provide a demonstration apparatus for the principle of the inclined plane which is small and compact for easy transport in a folded state and which unfolds and can be erected to form a larger, easily-viewed lecture aid.

Another object of this invention is to provide apparatus for illustrating the forces involved in inclined plane, wheel and axle, lever and pulley mechanics by visual identification of colors.

Another object of this invention is to provide an inclined plane and cart kit in which the components themselves form the accessory carrying case.

Other objects and attendant advantages of this invention will become more readily apparent and understood from the accompanying specification and drawings in which:

FIG. 5 is an enlarged longitudinal section of the spring balance for the demonstration kit of FIG. 1;

FIG. 6 is a cross section taken on line 6—6 of FIG. 5;

FIGS. 7 and 8 are reduced scale views of the spring balance of FIG. 5 in the retracted and extended conditions respectively; and FIG. 9 is a side elevation of the educational kit as set up for demonstration.

Figure 1:
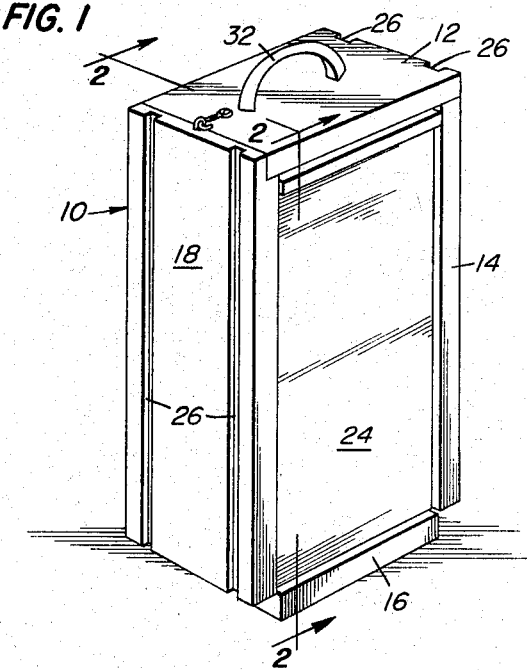
FIG. 1 is a perspective view of an educational demonstration kit incorporating features of the invention shown assembled for portability.
Figure 2:
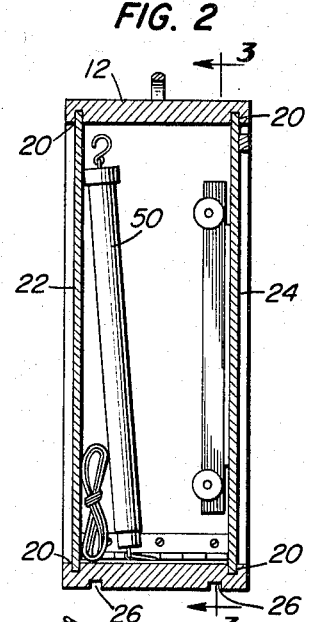
FIG. 2 is a vertical section taken on line 2—2 of FIG. 1.
Figure 3:
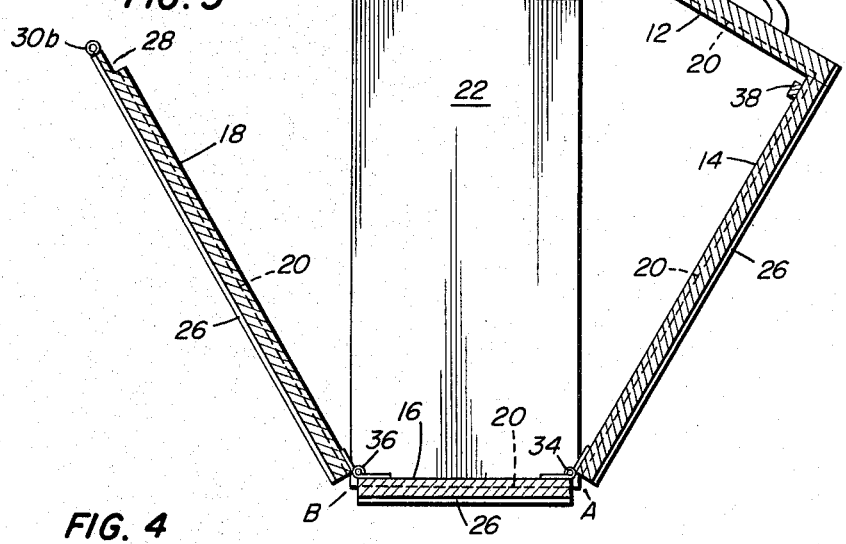
FIG. 3 is a vertical section taken on line 3—3 of FIG. 2 with the sides thereof partly unfolded, wheeled panel and accessories removed.

Referring now to the details of the drawings, as shown in FIGS. 1, 2 and 3, the demonstration kit of this invention consists of an unfoldable case 10 having rectangular shaped members namely a top 12, a right side 14, a bottom 16 and a left side 18. The top 12 is secured by screws, nails or glue to the right side 14 but the bottom 16 is attached by hinges 34 and 36, respectively, to the right side 14 and left side 18.

The inner faces of the case members 12, 14, 16 and 18 are each provided with a mortise 20 cut parallel to and close to both of their long edges to snugly receive the edges of removable panels 22 and 24 which inserted therein complete the case 10. Similar grooves are machined on the outer faces excluding the top 12 and these constitute track grooves 26.

The upper end of the left side 18 is provided with a step 28 to receive the adjacent end of the top 12 and a clasp hook and eye 30a and 30b is provided at this location. A carrying handle 32 is secured to the center of the top 12.

The adjacent ends at A and B of sides 14, 18, and bottom 16 are accurately machined to be square as shown in FIG. 3 so that when the case 10 is unfolded completely as shown in FIG. 9 an extended rigid co-planar structure results.

When placed on the surface of a table, this structure comprising members 14, 16 and 18 may be supported at one end by the top 12 alone for a gentle inclination, or by inserting the removable panel 22 behind a cleat 38, a greater inclination is provided.

Figure 4:
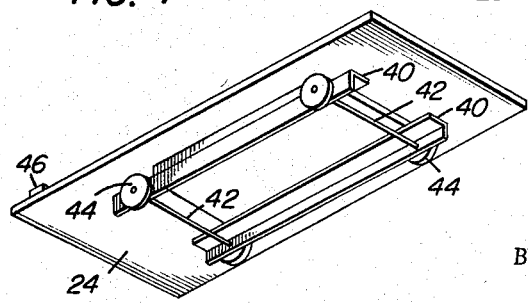
FIG. 4 is a perspective view of the underside of the wheeled panel showing wheel structure.

The remaining panel 24 becomes the weight carrying cart for the apparatus and for this purpose a wheel structure is mounted thereon consisting of a pair of spaced structured angle strips 40 as shown in FIG. 4. Axles 42 extend between these strips 40 through holes therein and mount wheels 44. These wheels 44 are of such thickness and are so spaced as to ride freely in the previously mentioned track grooves 26. To prevent a weight W from sliding off the panel 24 when used as a cart, a cleat or stop 46 is secured across one end thereof as shown.

To more strikingly present the force analysis to a large group of students, a special spring balance 50 is used to pull a weight up the inclined plane previously described and to indicate a change in the required force, spring balance 50 is used to pull the cart or panel 24 with the aforementioned weight up the inclined plane. Balance 50 may also be used to strikingly present the force analysis of levers, wheel-and-axle, and pulleys to a large group of stduents. This balance 50 comprises a pair of concentric tubes 52 and 54 as shown best in FIGS. 5 and 6. A cap 56 is provided on one end of each tube 54 and held thereon by a long rivet or pin 58. The pins 58 are engaged by the ends of a tension coiled spring 60 which extends within the inner tube 54. A hook 62 is provided for each cap 56.

With no tension being applied to separate the two hooks 62, the spring balance appears as shown in FIG. 7 with the inner tube 54 concealed within the outer tube 52.

When a separating force is applied between the hook 62 as resulting from the gravitational pull of a weight or of the weighted cart panel 24 up the inclined plane, the inner tube 54 becomes exposed to a length dependent on the force. This length and hence the force is made easily identifiable by colored graduations 64 green, white, orange, yellow, etc., as shown in FIGS. 8 and 9.

When the experiment is over, the spring balance 50, cord, weights, etc., may be transported or stored in the erected case as shown in FIG. 2. The cart wheel structure items 40, 42, 44 being part of the assembly of panel 24 require no attention at this time and cannot be mislaid.

Obviously many modifications and variations of the present invention are possible in light of the above teachings. It is, therefore, to be understood that within the scope of the appended claims the invention may be practiced otherwise than as specifically described.

What is claimed is:

1. A demonstration kit, comprising, a case having a bottom side, a pair of opposite sides hingedly connected to said bottom side, said pair of opposite sides being unfoldable with respect to said bottom side to form a rigid co-planar structure therewith, a top side mounted on one of said opposite sides and removably secured to the other of said opposite sides, said top side being for elevating one end of said rigid co-planer structure to form an inclined plane, and a pair of panels removably positioned between said pair of opposite sides and said bottom and top sides to form said case, and demonstration means positioned within said case.

2. The demonstration kit as recited in claim 1, wherein said pair of opposite sides and said bottom side each have a pair of grooves in the outer surface thereof which are co-extensive to form a pair of tracks along said inclined plane.

3. The demonstration kit as recited in claim 2, wherein wheels are mounted on one of said removably positioned panels to form a cart for traversing said pair of tracks along said inclined plane.

4. The demonstration kit as recited in claim 1, wherein said demonstration means includes a cart formed from one of said panels, said one panel having wheels mounted thereon, and a spring balance for pulling weights and said cart with weights and measuring the force required thereby.

5. A demonstration kit comprising a case having a bottom side, a pair of opposite sides hingedly connected to said bottom side and unfoldable with respect thereto to form a rigid co-planar structure, a top side rigidly mounted to one of said opposite sides for elevating one end of said rigid co-planar structure and removably secured to the other of said opposite sides, and a pair of panels removably positioned between said pair of opposite sides and said top and bottom sides to form said case, with one of said panels having wheels positioned on one side thereof to form a cart for traversing said rigid co-planar structure, and means indicating the force required for said cart to traverse said rigid co-planar structure.

6. The demonstration kit as recited in claim 5, wherein a pair of grooves are provided in each side of said pair of opposite sides and said bottom side to form a pair of tracks for said cart along said rigid co-planar structure.

7. The demonstration kit as recited in claim 5, and additionally a cleat member mounted on said one opposite side and spaced from said top side for retaining the end of the other panel of said pair of panels to incline said rigid co-planar structure.

8. The demonstration kit as recited in claim 5, wherein said indicating means consists of a pair of concentric tubes having a spring connected between the end of one of said tubes and the opposite end of the other of said tubes, with the inner tube of said pair of concentric tubes having spaced longitudinal portions of different colors for providing a visual indication at a distance of said force.

9. In combination, a case having three of its sides unfoldable to form a rigid co-planar structure, a fourth side to elevate one end of said rigid co-planar structure, and a fifth side having wheels mounted thereon to form a cart for traversing said rigid co-planar structure, and means indicating the force required for said cart to traverse said rigid co-planar structure.

References Cited by the Examiner

UNITED STATES PATENTS

| | | | |
|---|---|---|---|
| 479,718 | 7/1892 | Morgan et al. | 177—232 |
| 1,147,519 | 7/1915 | Link | 217—9 |
| 1,363,062 | 12/1920 | Steere | 312—241 |
| 3,131,667 | 5/1964 | Sajeck | 116—70 |

OTHER REFERENCES

L. E. Knott Apparatus Company, Catalogue of Scientific Instruments, October 20, 1916, Library, pages 96, 117, 118, 121 only relied on. Q 185 K72 1916.

EUGENE R. CAPOZIO, *Primary Examiner.*

HARLAND S. SKOGQUIST, *Assistant Examiner.*